US011725392B2

United States Patent
Clark et al.

(10) Patent No.: US 11,725,392 B2
(45) Date of Patent: Aug. 15, 2023

(54) DECORATIVE SIDING PANEL, SIDING SYSTEM AND METHOD OF MANUFACTURE

(71) Applicant: CertainTeed LLC, Malvern, PA (US)

(72) Inventors: Robert T. Clark, Philadelphia, PA (US); Jeanlouise Hornberger, Reading, PA (US); Christopher Colyn, Jackson, MI (US)

(73) Assignee: CertainTeed LLC, Malvern, PA (US)

( * ) Notice: Subject to any disclaimer, the term of this patent is extended or adjusted under 35 U.S.C. 154(b) by 219 days.

(21) Appl. No.: 17/135,031

(22) Filed: Dec. 28, 2020

(65) Prior Publication Data

US 2023/0120445 A1    Apr. 20, 2023

Related U.S. Application Data (60) Provisional application No. 62/954,750, filed on Dec. 30, 2019.

(51) Int. Cl.
*E04F 13/08* (2006.01)
*E04F 13/18* (2006.01)
(Continued)

(52) U.S. Cl.
CPC ........ *E04F 13/0871* (2013.01); *B29C 48/002* (2019.02); *B29C 48/07* (2019.02);
(Continued)

(58) Field of Classification Search
CPC ... E04F 13/0871; E04F 13/0894; E04F 13/18; B29C 48/002; B29C 48/07; B29L 2031/776
See application file for complete search history.

(56) References Cited

U.S. PATENT DOCUMENTS

| 291,215 A | * | 1/1884 | Moneyment | ............ E04F 15/02 |
| | | | | 52/311.1 |
| 3,611,660 A | * | 10/1971 | Costello | .............. E04F 13/0871 |
| | | | | 52/530 |

(Continued)

FOREIGN PATENT DOCUMENTS

NL    2017681 B1    5/2018

OTHER PUBLICATIONS

ModularArts, "InterlockingRock(R)," Sep. 2019, https://web.archive.org/web/20190916005340/http://www.modulararts.com/.

(Continued)

*Primary Examiner* — Rodney Mintz
(74) *Attorney, Agent, or Firm* — McDonnell Boehnen Hulbert & Berghoff LLP (57) ABSTRACT

The present disclosure relates generally to cladding for covering a building surface, for example suitable for covering the exterior surface of a building. The present disclosure relates more particularly to a siding panel including a panel body having a length, a width, a front face, and a rear face. The panel body further includes a first strip extending along the length of the panel body with a three dimensional surface texture. The three dimensional surface texture is a geometric pattern repeating along the front face of the panel body. The panel body includes a second strip extending along the length of the panel body adjacent to the first strip with a surface texture that is different than that of the first strip. The siding panel further includes a first lock, a second lock, and a fastening strip secured to the first lock.

18 Claims, 7 Drawing Sheets

(51) Int. Cl.
    *B29C 48/07*     (2019.01)
    *B29C 48/00*     (2019.01)
    *B29L 31/00*     (2006.01)

(52) U.S. Cl.
    CPC ..... *E04F 13/0894* (2013.01); *B29L 2031/776* (2013.01); *E04F 13/18* (2013.01)

(56) References Cited

U.S. PATENT DOCUMENTS

| | | | | |
|---|---|---|---|---|
| 4,352,771 A * | 10/1982 | Szabo | ............. | B29C 48/919 |
| | | | | 425/384 |
| 4,672,789 A * | 6/1987 | Fortier | ............. | E04F 13/18 |
| | | | | 52/519 |
| 5,506,031 A | 4/1996 | Spain | | |
| 5,565,260 A * | 10/1996 | Hawk | ............. | B05C 1/0808 |
| | | | | 427/428.15 |
| 5,918,435 A * | 7/1999 | McGowen | ............. | E04F 19/026 |
| | | | | 52/287.1 |
| 6,026,624 A * | 2/2000 | Patel | ............. | E04F 13/0864 |
| | | | | 52/529 |
| 6,161,354 A * | 12/2000 | Gilbert | ............. | B29C 51/24 |
| | | | | 52/543 |
| 6,295,777 B1 * | 10/2001 | Hunter | ............. | E04F 13/18 |
| | | | | 52/311.1 |
| 6,367,218 B2 * | 4/2002 | Lombardo | ............. | E04F 13/0882 |
| | | | | 52/391 |
| 6,490,835 B1 * | 12/2002 | Simmons | ............. | E04F 13/18 |
| | | | | 40/594 |
| 7,454,866 B2 * | 11/2008 | Maurer | ............. | H05K 3/0058 |
| | | | | 52/235 |
| D622,419 S | 8/2010 | King | | |
| 9,091,081 B2 * | 7/2015 | Yuzuriha | ............. | E04F 13/0875 |
| 9,091,086 B2 * | 7/2015 | Michalski | ............. | E04F 13/0894 |
| D896,403 S * | 9/2020 | Rouleau | ............. | D25/143 |
| 11,466,850 B2 * | 10/2022 | Beck | ............. | F21V 33/006 |
| 11,498,357 B2 * | 11/2022 | Briggs | ............. | E04F 15/022 |
| 2002/0034629 A1 * | 3/2002 | Jones | ............. | B29C 48/33 |
| | | | | 428/512 |
| 2004/0200164 A1 * | 10/2004 | Schrunk | ............. | E04F 13/0871 |
| | | | | 52/311.1 |
| 2006/0003144 A1 * | 1/2006 | Kaump | ............. | E04C 2/043 |
| | | | | 428/156 |
| 2006/0234016 A1 * | 10/2006 | Neill | ............. | B44C 1/28 |
| | | | | 428/195.1 |
| 2006/0283116 A1 * | 12/2006 | Maurer | ............. | B44C 5/0415 |
| | | | | 52/384 |
| 2007/0009706 A1 * | 1/2007 | Beck | ............. | C08J 7/046 |
| | | | | 428/99 |
| 2008/0190061 A1 | 8/2008 | Roh | | |
| 2009/0056266 A1 * | 3/2009 | Yuzuriha | ............. | E04F 13/147 |
| | | | | 52/506.05 |
| 2009/0282751 A1 * | 11/2009 | Orfield | ............. | B29C 48/0022 |
| | | | | 83/13 |
| 2011/0154776 A1 * | 6/2011 | Simms | ............. | E04F 13/12 |
| | | | | 52/748.11 |
| 2012/0028071 A1 * | 2/2012 | Lyubomirskiy | ............. | E04F 13/0871 |
| | | | | 428/173 |
| 2012/0034485 A1 * | 2/2012 | Lyubomirskiy | ............. | E04F 13/0871 |
| | | | | 428/173 |
| 2012/0040204 A1 * | 2/2012 | Lyubomirskiy | ............. | E04F 13/0871 |
| | | | | 428/600 |
| 2012/0317913 A1 | 12/2012 | Esquivel | | |
| 2014/0202109 A1 * | 7/2014 | Michalski | ............. | E04F 13/0875 |
| | | | | 428/156 |
| 2020/0398609 A1 * | 12/2020 | Briggs | ............. | E04F 13/0862 |
| 2021/0079663 A1 * | 3/2021 | Bredeweg | ............. | E04F 13/0846 |
| 2021/0222865 A1 * | 7/2021 | Beck | ............. | F21S 4/28 |
| 2021/0348395 A1 * | 11/2021 | Heikkila | ............. | C08K 7/14 |
| 2022/0381040 A1 * | 12/2022 | Colyn | ............. | E04F 13/0894 |

OTHER PUBLICATIONS

ModularArts, "Product Comparison Chart," Sep. 2019, https://web.archive.org/web/20190909063025/http://www.modulararts.com/compare.html.

* cited by examiner

DECORATIVE SIDING PANEL, SIDING SYSTEM AND METHOD OF MANUFACTURE

CROSS-REFERENCE TO RELATED APPLICATIONS

This application claims the benefit of priority of U.S. Provisional Patent Application No. 62/954,750, filed Dec. 30, 2019, which is hereby incorporated herein by reference in its entirety.

BACKGROUND OF THE DISCLOSURE

1. Field of the Disclosure

The present disclosure relates generally to cladding for covering a building surface. The present disclosure relates more particularly to decorative siding panels configured to form a visible surface over a support structure.

2. Technical Background

Building surface panels, such as cladding or siding, are visible elements that cover an underlying support structure. Siding panels are typically used in the construction of homes, businesses, and other buildings on exterior walls. The siding panels can provide protection to the underlying support structure from weather and other elements.

Siding panels also offer aesthetic importance. Such panels come in various profiles to allow for different aesthetic options. For example, manufactured siding products can have many different profiles including clapboard, dutchlap, bead board, board and batten, shake siding, or shingle siding. The variety of different siding profile options allows architects and builders to choose a particular aesthetic for the building surface.

While traditional siding panels offer various advantages, these products do not offer the option for additional decorative designs. Panels typically have a uniform look so that although there are different profile options, once one is chosen, it is the same repeating profile.

Such panels do not offer decorative variation.

Accordingly, the present inventors have determined that a siding panel including decorative elements would be desirable to architects and builders.

SUMMARY OF THE DISCLOSURE

In one aspect, the present disclosure provides a siding panel comprising:

a panel body having a length extending from a first end to a second end, a width extending from a first edge to a second edge, a front face, and a rear face, the panel body comprising:
  a first strip extending along the length of the panel body and including a three dimensional surface texture on the front face, the three dimensional surface texture having a geometric pattern including a pattern segment that repeats along the length of the panel body, and
  a second strip extending along the length of the panel body adjacent to the first strip and including a surface texture that is different than the surface texture of the first strip;
  a first lock extending along the first edge of the panel body;
  a second lock extending along the second edge of the panel body; and
  a fastening strip secured to the first lock.

In another aspect, the disclosure provides a building surface cladding system comprising:
  a support structure;
  a first building surface panel according to the disclosure attached to the support structure;

In another aspect, the disclosure provides a method of forming a siding panel according to the disclosure, the method comprising:
  extruding a material sheet through a die;
  positioning the material sheet against a form with a three dimensional pattern surface;
  pressing the material sheet against the three dimensional pattern surface of the form to impart the three dimensional surface texture to a front surface of the material sheet;
  shaping the material sheet so as to form the panel body, the first lock, the second lock, and the fastening strip.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure and, together with the description, serve to explain the principles and operation of the disclosure.

DETAILED DESCRIPTION

As described above, the present inventors have noted that conventional siding panels lack embellishment and varieties of patterns. The present inventors have determined that a siding panel including decorative elements would be attractive to builders.

Accordingly, one aspect of the disclosure is a siding panel including a panel body having a length extending from a first end to a second end, a width extending from a first edge to a second edge, a front face, and a rear face. The panel body further includes a first strip extending along the length of the panel body with a three dimensional surface texture on the front face. The three dimensional surface texture has a geometric pattern including a pattern segment that repeats along the length of panel body. The panel body also includes a second strip extending along the length of the panel body adjacent to the first strip with a surface texture that is different than the surface texture of the first strip. The siding panel further includes a first lock extending along the first edge of the panel body, a second lock extending along the second edge of the panel body, and a fastening strip secured to the first lock.

Figure 1:
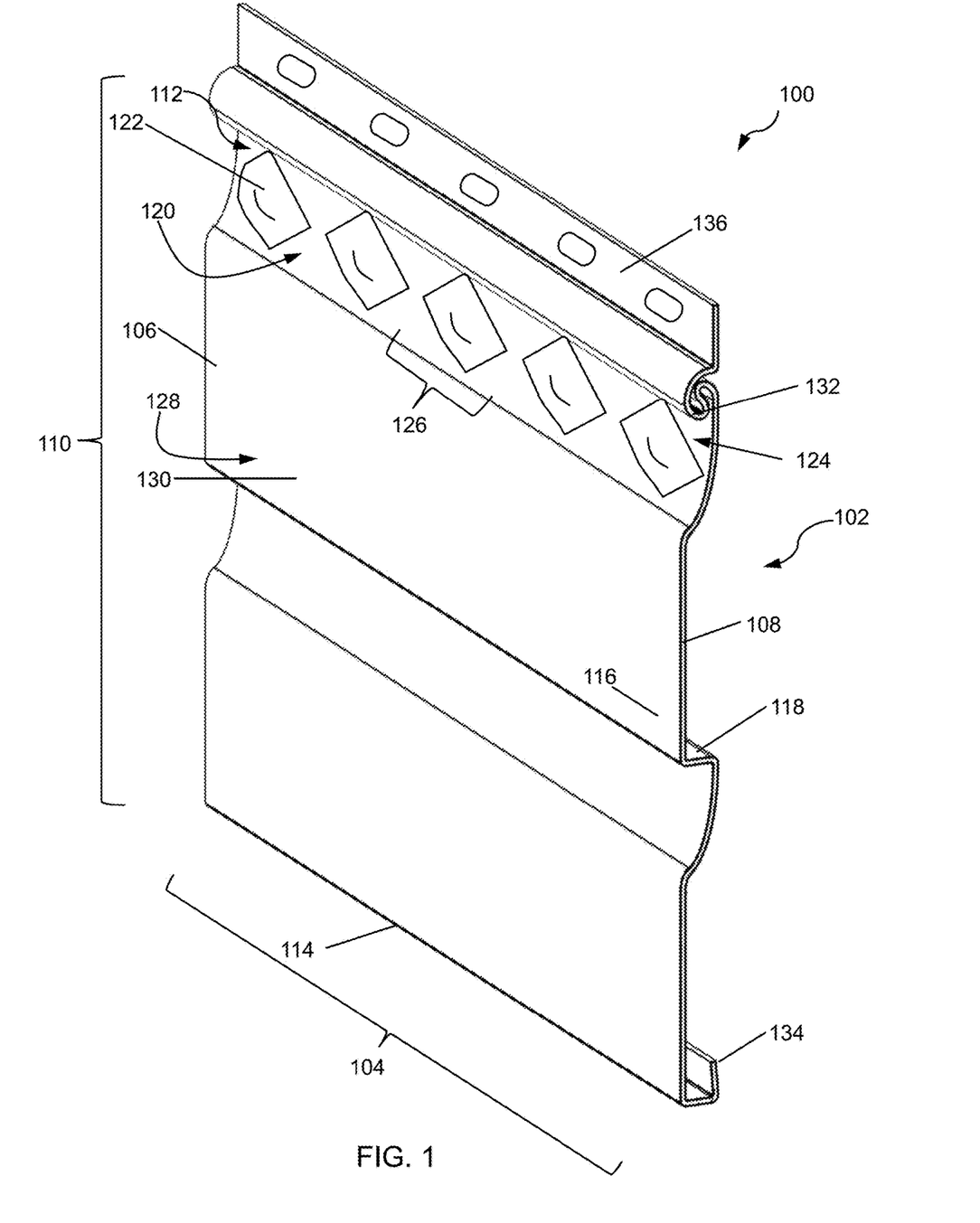
FIG. 1 is a schematic perspective view of a decorative siding panel according to an embodiment of the disclosure.

Such a siding panel is shown in FIG. 1. Siding panel 100 includes a panel body 102 with a length 104 and a width 110. Length 104 is characterized as the dimension extending from a first end 106 to a second end 108, while width 110 is characterized as the dimension extending between a first edge 112 and a second edge 114. Panel body 102 has a front face 116 and a rear face 118 disposed on opposite sides of panel body 102. When siding panel 100 is installed on a support structure, such as an exterior wall, front face 116 is configured to face outwardly and be visible, while rear face 118 is configured to face the support structure. Front face 116 and rear face 118 extend across panel body 102 from first end 106 to second end 108 and from first edge 112 to second edge 114. Panel body 102 also includes a first strip 120 extending along length 104 of panel body 102. First strip 120 has a width that makes up a portion of width 110 of panel body 102. First strip 120 includes a three dimensional surface texture 122 on front face 116 of panel body 102 that is visible when siding panel 100 is installed on a support structure. Three dimensional surface texture 122 has a geometric pattern 124 with a pattern segment 126 that repeats along length 104 of panel body 102. In some embodiments, the geometric pattern is only visible on the front face of the panel body. In other embodiments, the geometric pattern is also visible on the rear face of the panel body.

Panel body 102 also includes a second strip 128 extending along length 104. Second strip 128 also makes up a portion of width 110 of panel body 102, and is adjacent to first strip 120. In particular, second strip 128 abuts first strip 120 such that they have a common boundary. Second strip 128 has a different surface texture 130 than surface texture 122 of first strip 120. In some embodiments, the second strip has a flat surface texture. In other embodiments, the second strip has a wood grain surface texture.

Siding panel 100 also includes a first lock 132 extending along first edge 112 of panel body 102 and a second lock 134 extending along second edge 114 of panel body 102. First lock 132 is configured to be received in a corresponding second lock of a neighboring siding panel having a similar construction. Likewise second lock 134 is configured to receive a corresponding first lock of another neighboring siding panel that has a similar construction. Siding panel 100 also includes a fastening strip 136 secured to first lock 132 and positioned above first lock 132. Fastening strip 136 is in the form of a nail hem that secures siding panel while in use. In some embodiments, the fastening strip is hidden from view when the first lock is received in a corresponding second lock of another siding panel.

In certain embodiments of the siding panel as otherwise described herein, a length of the repeating pattern segment of the geometric pattern is no more than 6 inches. For example, geometric pattern 124 has pattern segment 126 which frequently repeats down length 104 of panel body 102. In some embodiments, the pattern segment is no more than 6 inches long before it repeats. In other embodiments, the pattern segment is at least 1 inch long and repeats down the length of the panel body. In other embodiments still, the pattern segment is a different length less than 6 inches long that repeats down the length of the panel body.

Figure 2:
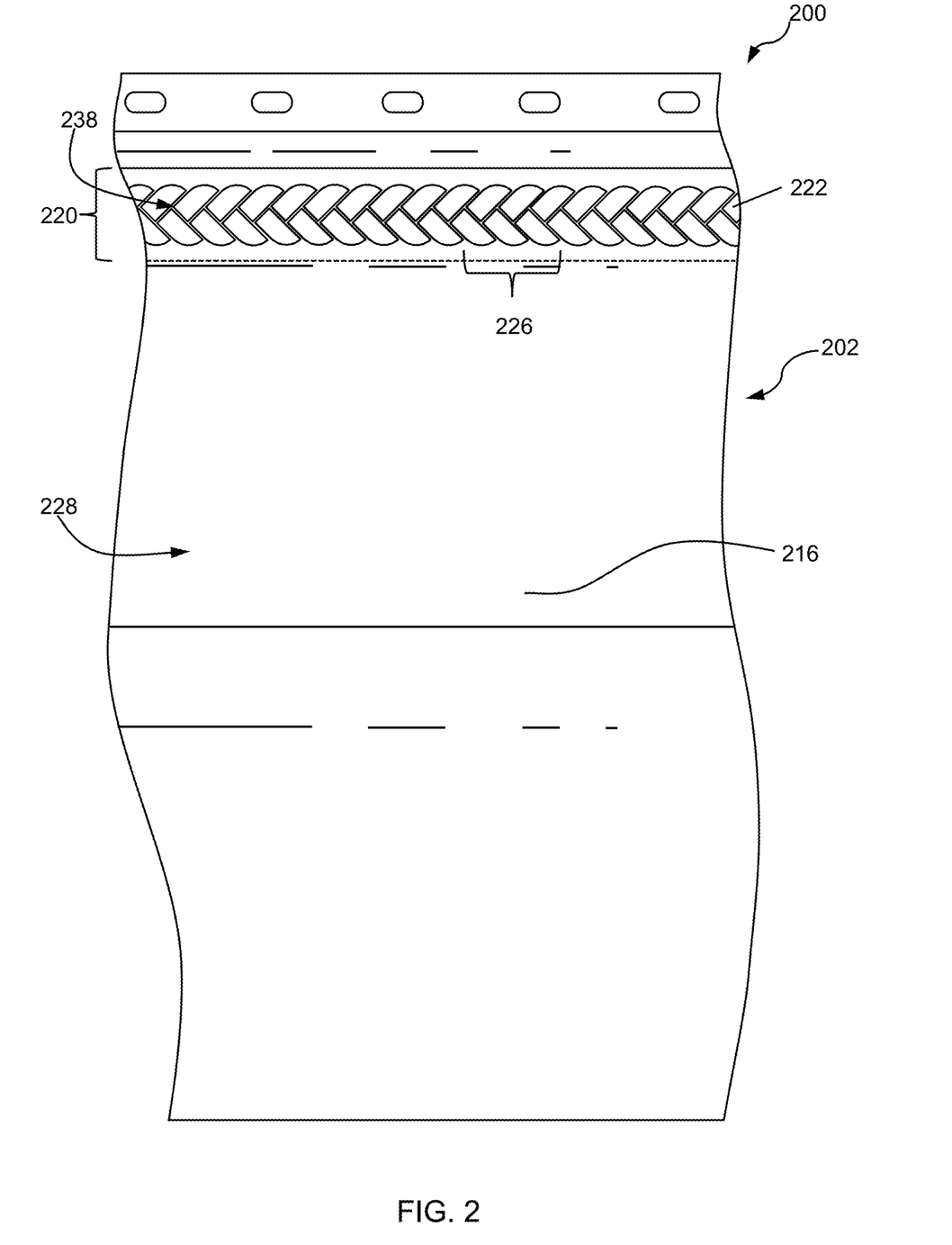
FIG. 2 is a schematic front view of a decorative siding panel according to an embodiment of the disclosure.
Figure 3:
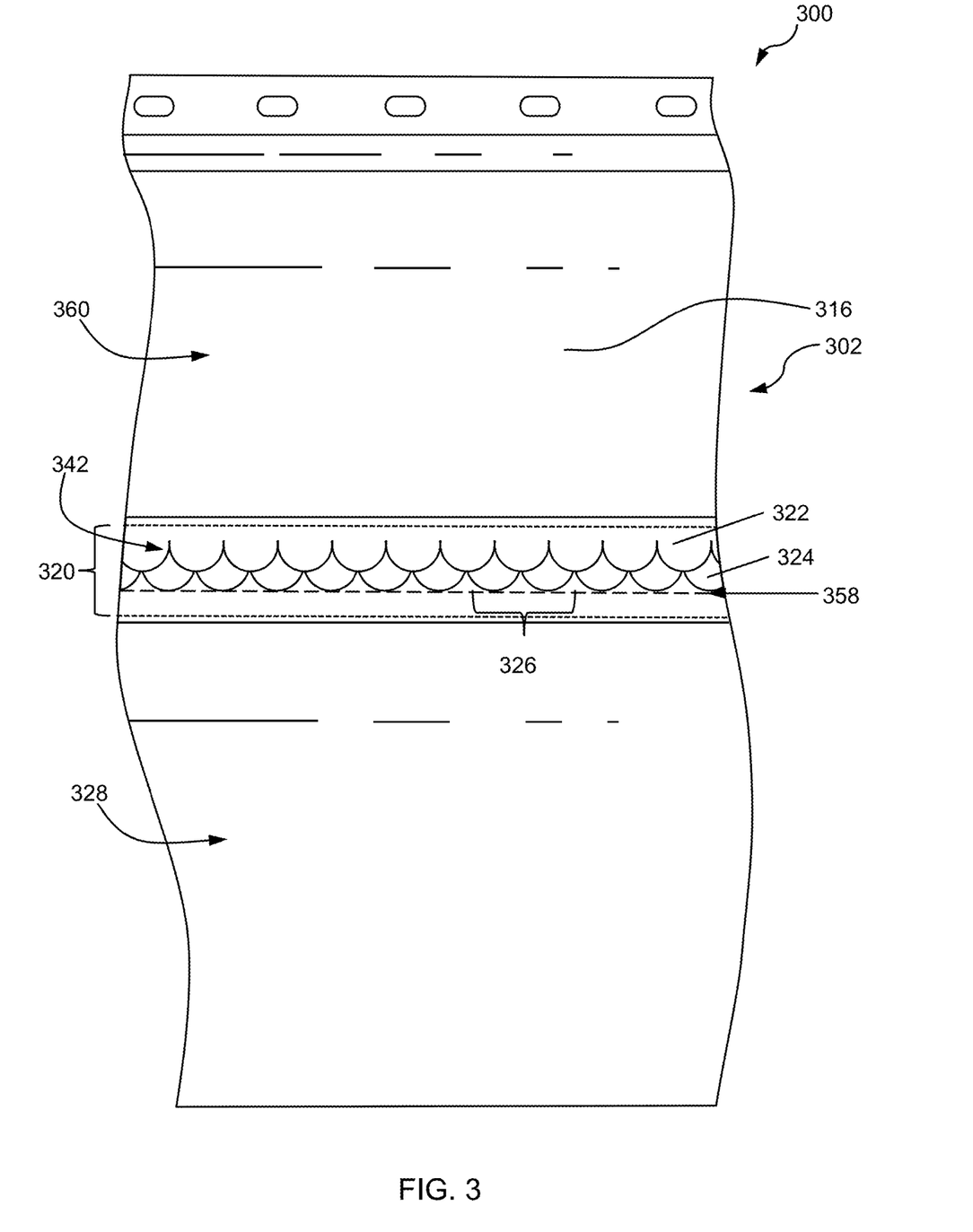
FIG. 3 is a schematic front view of a decorative siding panel according to another embodiment of the disclosure.
Figure 4:
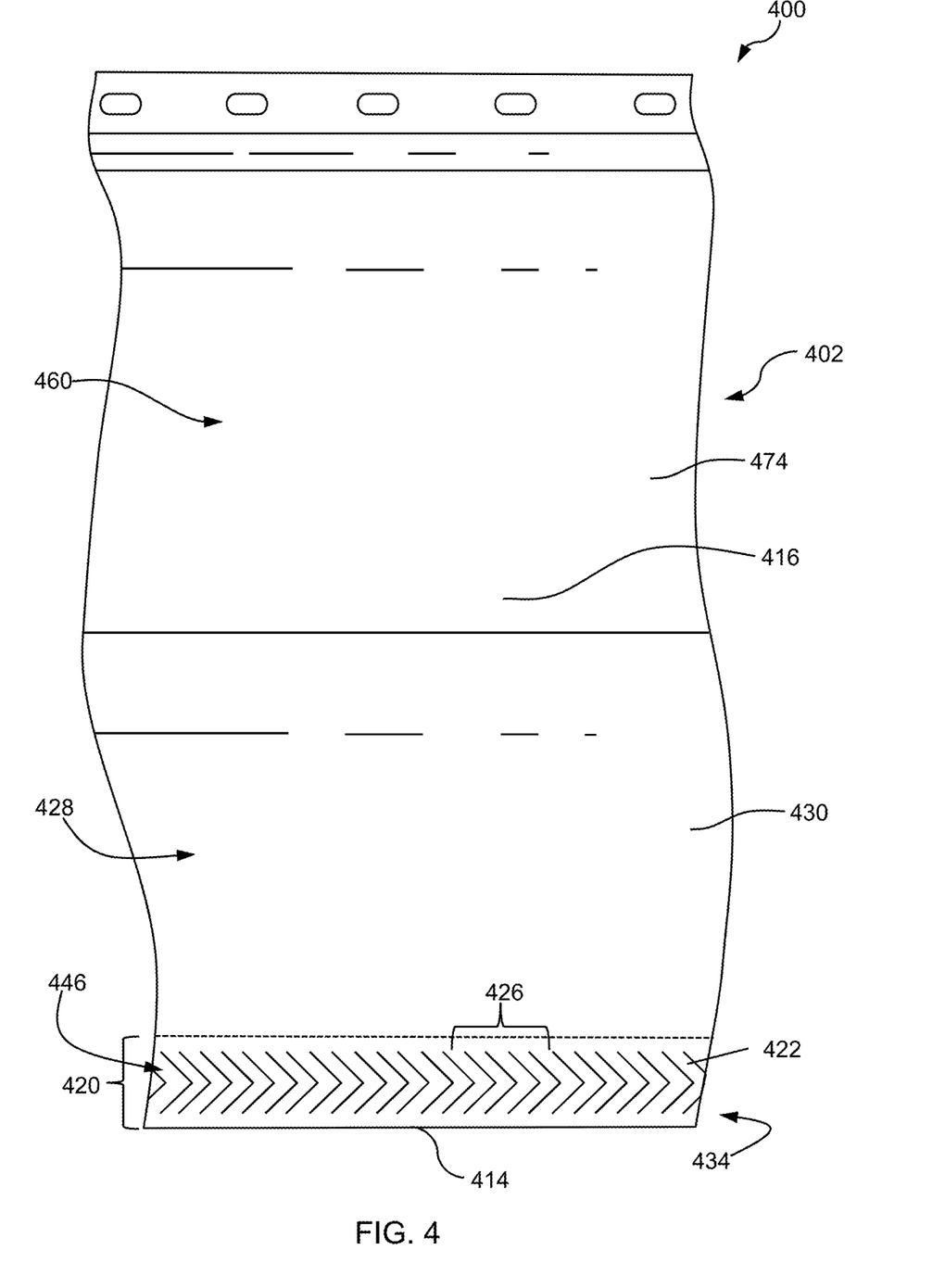
FIG. 4 is a schematic front view of a decorative siding panel according to yet another embodiment of the disclosure.

In certain embodiments of the siding panel as otherwise described herein, the geometric pattern is in a category of woven patterns, scale patterns, repeated line shapes, repeated polygons, or repeated elliptical shapes. The geometric pattern may be chosen from a plurality of different patterns or shapes. The category chosen dictates the kind of three dimensional surface texture. FIGS. 2-4 illustrate examples of different geometric patterns that are included in embodiments of the first strip of the panel body, as described in more detail below.

In certain embodiments the geometric pattern is a woven pattern. As used herein, the term woven pattern refers to any design pattern that has the appearance of curving strands that are intertwined, such as ropes, braids or knots, or has the appearance of straight interlaced strands such as hounds tooth, herringbone, or basket weave patterns. An embodiment of a siding panel including a woven pattern is shown in FIG. 2. Siding panel 200 includes a panel body 202 having a front face 216. Panel body 202 also includes a first strip 220 extending along the length of panel body 202 and a second strip 228 also extending along the length of panel body 202. First strip 220 includes a three dimensional surface texture 222 on front face 216 including a pattern segment 226 that repeats along the length of panel body 202. Pattern segment 226 is a woven pattern 238 in the form of a braid.

In certain embodiments the geometric pattern is a scale pattern. As used herein, the term scale pattern refers to any design pattern that has the appearance of partial overlapping plates such as scallops or scales. An embodiment of a siding panel including a scale pattern is shown in FIG. 3. Siding panel 300 includes a panel body 302 having a front face 316 and including a first strip 320 extending along the length of panel body 302 and a second strip 328 extending along the length of panel body 302. First strip 320 includes a three dimensional surface texture 322 on front face 316 including a pattern segment 326 that repeats along the length of panel body 302. Pattern segment 326 is a scale pattern 342 in the form of scallops. While the elements of scale pattern 342 overlap in a vertical direction, in other embodiments, the elements overlap in a horizontal direct.

In certain embodiments the geometric pattern is a repeated line pattern. As used herein, the term repeated line pattern refers to any design pattern that has the appearance of straight lines that bend at sharp angles with sharp corners such as chevron, crosshatch, argyle, herringbone, stripes, and fret patterns. Repeated line shapes are contrasted with woven patterns which have curving lines and soft corners to mimic woven fibrous strands, whereas repeated line shapes are sharp and angular. An embodiment of a siding panel including a repeated line pattern is shown in FIG. 4. Siding panel 400 includes a panel body 402 having a front face 416 and a first strip 420 extending along the length of panel body 402. Panel body 402 also includes a second strip 428 extending along the length of panel body 402. First strip 420 includes a three dimensional surface texture 422 on front face 416 including a pattern segment 426 that repeats along the length of panel body 402. Pattern segment 426 is a repeated line pattern 446 in the form of chevron.

In some embodiments, the repeated geometric pattern includes repeated polygons. For example, in some embodiments, the repeated polygons are squares. In other embodiments, for example, the repeated polygons are triangles, or pentagons. Other regular or complex polygons, such as stars, are also possible. Further, in some embodiments, the geometric pattern of repeated polygons includes a series of repeated polygons (e.g. square, triangle, square, etc.). Alternatively, the geometric pattern can be a set of repeating symbols of a common shape, but in alternating sizes (e.g., large square, small square, even smaller square, large square, small square, even smaller square, etc.).

In some embodiments, the repeated geometric pattern includes repeated elliptical shapes. For example, in some embodiments, the repeated elliptical shapes are circles. In other embodiments, for example, the repeated elliptical shapes are ovals, or hemispheres. Other regular or complex elliptical shapes are also possible. For example, the term elliptical shape, as used herein, includes crescents. Further, in some embodiments, the geometric pattern of repeated elliptical shapes includes a series of repeated elliptical shapes (e.g. circle, oval, circle, etc.).

In certain embodiments of the siding panel as otherwise described herein, the surface texture of the second strip is flat. For example, second strip 128, shown in FIG. 1, includes a flat surface texture. In some embodiments, a flat surface texture is a planar surface that does not have dips, or bumps. Further, in some embodiments, the flat surface texture of the second strip is smooth.

In certain embodiments of the siding panel as otherwise described herein, the surface texture of the second strip is a wood grain pattern. Such a surface texture has the appearance of being made out of wood which creates a shallow three dimensional surface texture. In some embodiments, the wood grain pattern repeats itself down the length of the panel body. In other embodiments the wood grain pattern varies along the entire length of the panel body. Further, in some embodiments, the wood grain pattern is created by embossing the pattern onto the panel body. Further, in some embodiments, the wood grain pattern is created by different colors in the panel, such that they create textures or streaks in the length of the panel. Further, in some embodiments, the wood grain pattern is created by a printing method. In other embodiments, the wood grain pattern is created by another method for creating such a pattern.

In certain embodiments of the siding panel as otherwise described herein, the first strip extends along the length of the panel body from the first end of the panel body to the second end of the panel body. For example, first strip 120 with geometric pattern 124 extends the entire length 104 of panel body 102 from first end 106 to second end 108 with pattern segment 126 continuously repeating. In other embodiments, the first strip extends along a majority of the length of the panel body, e.g., at least 75%, e.g., at least 80%, e.g., at least 90%, e.g., at least 95%.

In certain embodiments of the siding panel as otherwise described herein, the second strip extends along the length of the panel body from the first end of the panel body to the second end of the panel body. For example, second strip 128 of siding panel 100 also extends down the entire length 104 of panel body 102.

In certain embodiments of the siding panel as otherwise described herein, a width of the first strip is at least 1 inch, e.g., at least 1.5 inches, e.g., at least 2 inches. Further in some embodiments, the width of the first strip is no more than 10 inches, e.g., no more than 6 inches, e.g., no more than 4 inches. For example, in some embodiments, the width of the first strip is in a range from 1 inch to 10 inches, e.g., from 1.5 inches to 6 inches, e.g., from 2 inches to 4 inches, e.g., from 1 inches to 6 inches, e.g., from 1 inches to 4 inches. Further, in some embodiments, the width of first strip is uniform along the length of the panel body. For example, first strip 120 of siding panel 100 has a consistent width down length 104 of panel body 102. In other embodiments, the width of the first strip varies down the length of the panel body. Further, in some embodiments, the width of the first strip covers less than half of the width of the panel body. In other embodiments, the width of the first strip covers the majority of the width of the panel body.

In certain embodiments of the siding panel as otherwise described herein, the first strip is adjacent to the first edge of the panel body. As used herein, the term adjacent encompasses abutting such that there is a common boundary. For example, first strip 120 is adjacent to first edge 112 by abutting first edge 112. Thus first edge 112 forms a boundary of first strip 120. As a result of being positioned adjacent to first edge 112, first strip 120 is also adjacent to first lock 132. In other embodiments, as described in more detail below, the first strip is not adjacent to the first edge.

In certain embodiments of the siding panel as otherwise described herein, the panel body has a middle half way between the first edge and the second edge, and the first strip is adjacent to the middle of the panel body. As used herein, the term adjacent encompasses both abutting configurations and overlapping configurations. For example, first strip 320 overlaps middle 358 of the panel body 302. In other embodiments, the first strip is adjacent to the middle of the panel body in that the first strip abuts the middle of the panel body, and the middle of the panel body forms a boundary of the first strip Still, in other embodiments, the first strip is closer to middle than to either the first edge or the second edge.

In certain embodiments of the siding panel as otherwise described herein, the first strip is adjacent to the second edge of the panel body. For example, first strip 420 is adjacent to second edge 414 by abutting second edge 414. Thus, second edge 414 of panel body 402 forms a boundary of first strip 420. As a result of being disposed at second edge 414, first strip 420 is also adjacent to the second lock 434. Further, in some embodiments, the first strip is closer to the second edge than it is to the middle, but the first strip does not abut the second edge.

Figure 5:
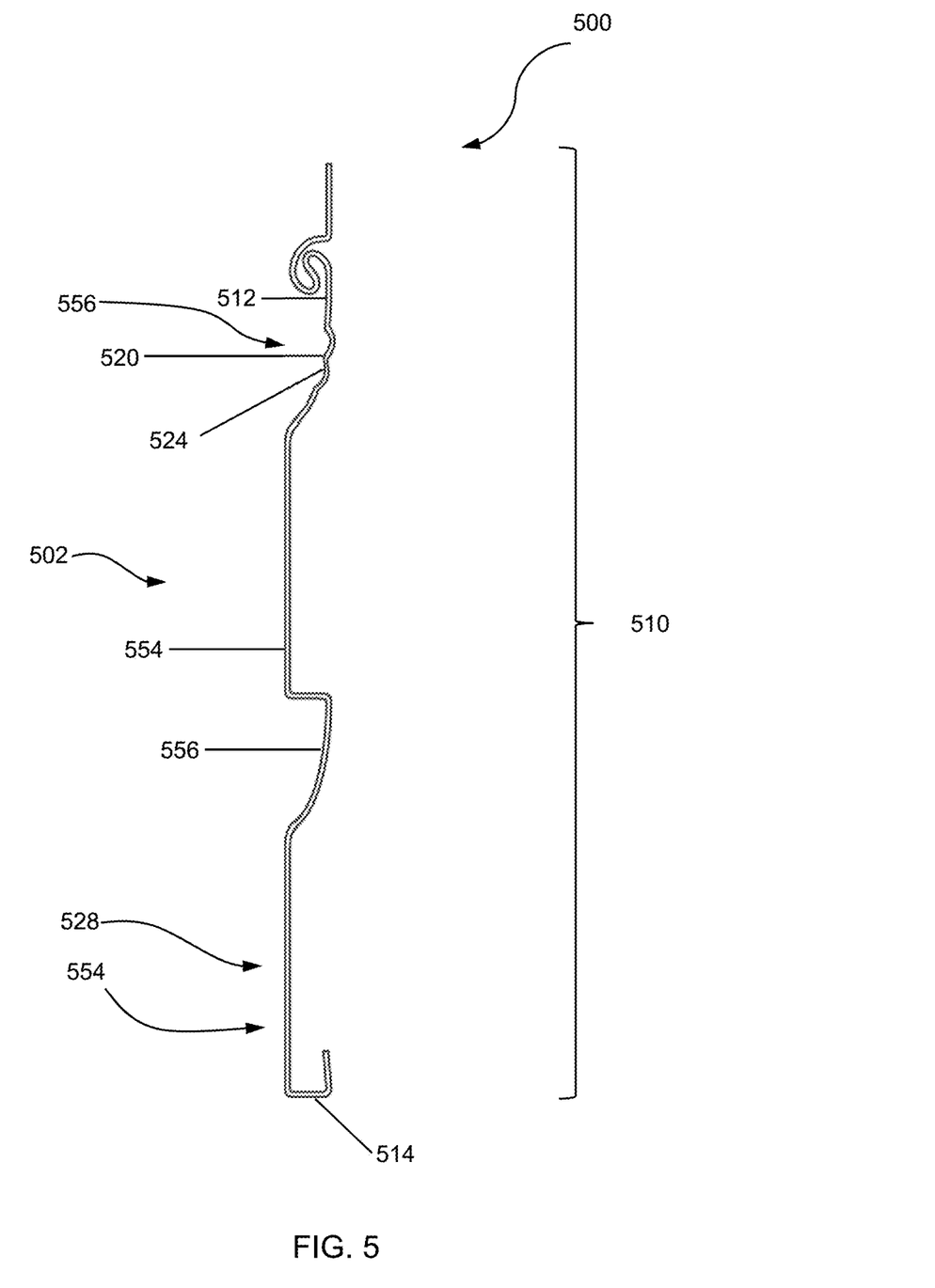
FIG. 5 is a schematic side view of a decorative siding panel according to another embodiment of the disclosure.

In certain embodiments of the siding panel as otherwise described herein, the panel body has a siding panel profile across the width of the panel body, where the siding panel profile includes a planar first profile section and a non-planar second profile section. An embodiment of a siding panel including a siding panel profile is shown in FIG. 5. Siding panel 500 includes a panel body 502 with a width 510 extending from a first edge 512 to a second edge 514. Panel body 502 has a dutchlap siding panel profile including a planar first profile section 554 and a non-planar second profile section 556. For example, first profile section 554 is a flat planar section that is configured to run parallel to the support structure on which siding panel 500 is placed. In contrast, second profile section 556 curves rearward from first profile section 554. While siding panel 500 includes a dutchlap siding panel profile, in other embodiments the siding panel has another profile, such as clapboard, bead board, board and batten, or others.

In certain embodiments of the siding panel as otherwise described herein, the first strip is disposed on the planar first profile section and the second strip is disposed on the non-planar second profile section. For example, first strip 420 is disposed on a planar section of panel body 402, while second strip 428 extends into a curved section of panel body 402.

In certain embodiments of the siding panel as otherwise described herein, the first strip is disposed on the non-planar second profile section and the second strip is disposed on the planar first profile section. For example, panel body 502 has a curved non-planar second profile section 556 and a flat planar first profile section 554. First strip 520 and the corresponding geometric pattern 524 are disposed on non-planar second profile section 556. Thus, the geometric pattern 524 is on the concave portion of panel body 502. In contrast, second strip 528 is on planar first profile section 554. Further, planar first profile section 554 and non-planar second profile section 556 proceed along the x-axis to the same extent. In other embodiments, the non-planar second profile section extends more or less than the planar first profile section.

In certain embodiments of the siding panel as otherwise described herein, the panel body includes a third strip. Similar to the first strip and the second strip, the third strip also extends along the length of the panel body. For example, siding panel 400 includes a planar third strip 460 in addition to first strip 420 and second strip 428 that extends along the length of panel body 402. The surface texture of the third strip is flat. Moreover, third strip 460 has a smooth surface texture 474. In other embodiments, the surface texture of the third strip is a wood grain pattern and gives the appearance of being made out of wood.

In certain embodiments of the siding panel as otherwise described herein, the first strip is disposed between the second strip and the third strip on the panel body. For example, first strip 320 and geometric pattern 324 are disposed at the middle 358 of panel body 302 such that first strip 320 is flanked above by third strip 360 and below by second strip 328. In other embodiments, the first strip and the second strip, together, extend across the entirety of the panel body and no additional strips are included, such as when the first strip is positioned at the top or the bottom of the panel body. Still, in other embodiments, the siding panel has more than one strip with a geometric pattern on it.

In certain embodiments of the siding panel as otherwise described herein, the first strip has a first color, the second strip has a second color, and the first and second colors are different. Alternatively in some embodiments, the first color of the first strip and the second color of the second strip are the same. In other embodiments, a portion of the geometric pattern on the first strip is one color while a portion of the geometric pattern has a different color. In other embodiments still, the geometric pattern is one color that is a different color than the rest of the first strip. It is further understood that a strip can be made of a series or collection of colors, and those combinations of colors can serve to create a pattern, such as a wood like appearance.

In certain embodiments of the siding panel as otherwise described herein, the panel body includes a backing member that extends from the first edge to the second edge, where the surface texture of the second strip is integrated with the backing member, and where the three dimensional surface texture of the first strip is disposed on a carrier that is attached to the backing member. The backing member encompasses the length and the width of the panel body and is at least a portion of the thickness of this panel body. In some embodiments, the carrier is removable from the backing member so that the carrier can be interchanged by clipping or adhering to the backing member.

Embodiments of the building surface panel may be formed from various different materials, and may be constructed in a single piece or in layers of material. In certain embodiments of the siding panel as otherwise described herein, the panel body is formed of one or more of polypropylene, polyethylene, polyvinyl chloride (PVC), acrylonitrile styrene acrylate (ASA), acrylonitrile ethylene styrene (AES), polyurethane, or acrylonitrile butadiene styrene (ABS).

In certain embodiments of the siding panel as otherwise described herein, the length of the panel body is at least 4 feet, e.g., at least 5 feet, e.g., at least 6 feet. Further, in some embodiments, the length of the panel body is no more than 30 feet, e.g., no more than 24 feet, e.g., no more than 18 feet. For example, in some embodiments, the length of the panel body is in a range from 4 feet to 30 feet, e.g., 6 feet to 24 feet, e.g., 8 feet to 20 feet. Likewise, in some embodiments of the siding panel as otherwise described herein, the width of the panel body is at least 3 inches, e.g., at least 3.5 inches, e.g., at least 5 inches. Further in some embodiments, the width of the panel body is no more than 24 inches, e.g., no more than 20 inches, e.g., no more than 16 inches, e.g. no more than 13 inches. For example, in some embodiments, the width of the panel body is in a range from 3 inches to 24 inches, e.g., from 4 inches to 18 inches, e.g., from 8 inches to 14 inches. Other lengths and widths are also possible.

In certain embodiments of the siding panel as otherwise described herein, the panel body has a material thickness in a range from 0.03 inches to 0.20 inches. For example, in some embodiments, the panel body is formed as a thin wall that is molded or extruded. Accordingly, in some embodiments, the panel body, the locks, and the fastening strip can be extruded or molded together in a single operation.

Figure 6:
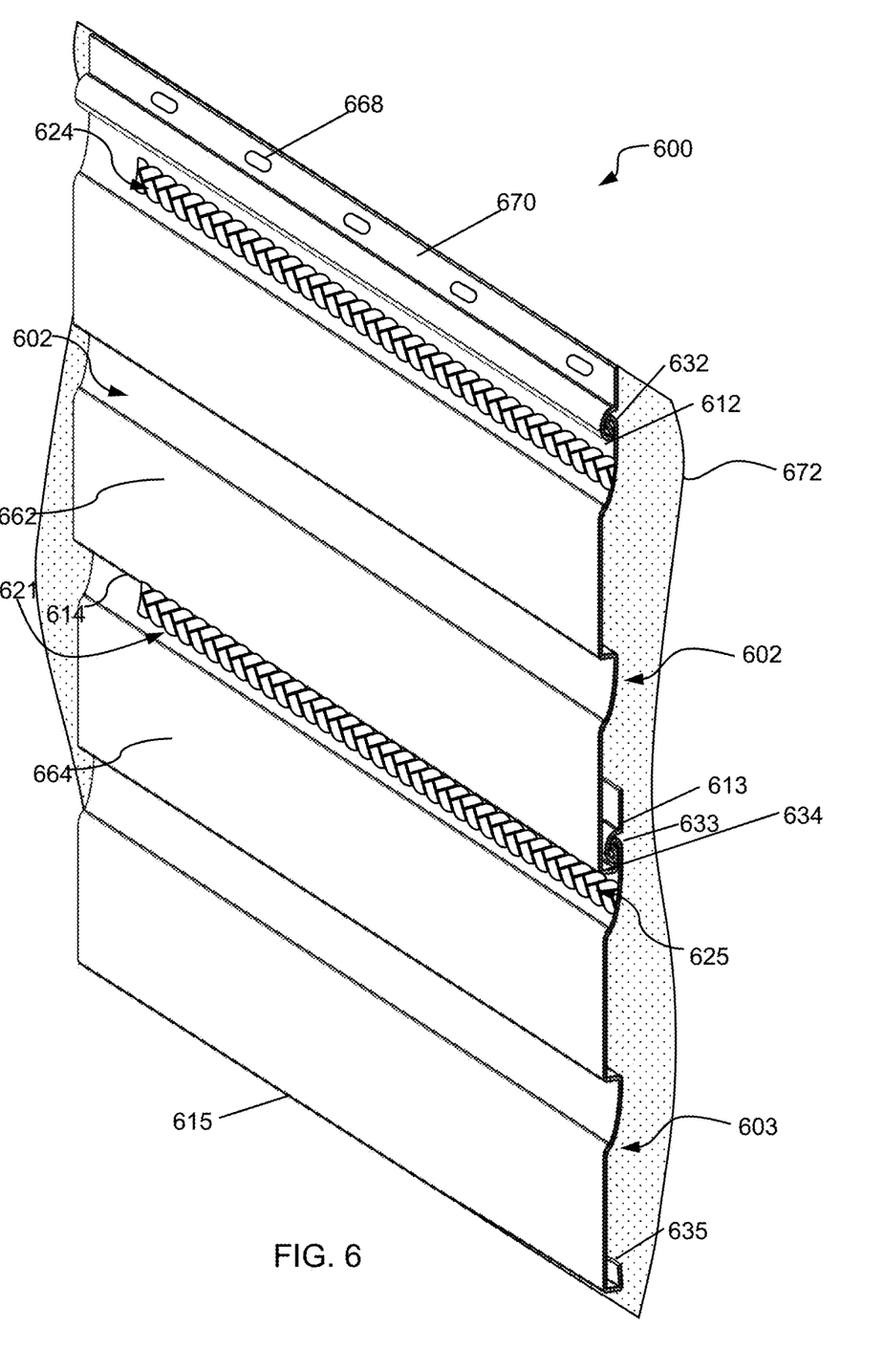
FIG. 6 is a schematic perspective view of a building surface cladding system according to an embodiment of the disclosure.

Another aspect of the disclosure is a building surface cladding system including a support structure and a first building surface panel according to the disclosure attached to the support structure. An embodiment of the building surface cladding system including a support structure and a first building surface panel is shown in FIG. 6. Building surface cladding system 600 includes a support structure 672 and a first building surface panel 662. First building surface panel 662 includes a panel body 602 with a first edge 612 and a second edge 614. A first lock 632 extends along first edge 612 of panel body 602 and a second lock 634 extends along second edge 614 of panel body 602. First building surface panel 662 also includes a first strip 612 including a geometric pattern 624. The first building surface panel is attached to support structure 672. The first building surface panel is configured to be installed on various different support structures, such as the walls of buildings or other structures.

In certain embodiments of the siding panel as otherwise described herein, the building surface cladding system forms an exterior wall surface. For example, in some embodiments the support structure is an exterior sheathing. As will be understood by those of ordinary skill in the art, such an exterior sheathing can include a rain protection layer, house wrap, and/or may include furring strips. In other embodiments, the support structure is another flat structural component of a construction wall.

In certain embodiments of the siding panel as otherwise described herein, the building surface cladding system comprises a second building surface panel according to the disclosure attached to the support structure. For example, building surface cladding system 600 includes a second building surface panel 664 locked to first building surface panel 662. Second building surface panel 664 includes a panel body 603 with a first edge 613 and a second edge 615. A first lock 633 extends along first edge 613 of panel body 603 and a second lock 635 extends along second edge 615 of panel body 603. Second building surface panel 664 also includes a first strip 621 including a geometric pattern 625. For example, first building surface panel 662 and second building surface panel 664 have the same geometric pattern. In other embodiments, the first building surface panel and the second building surface panel have different geometric patterns.

In certain embodiments of the siding panel as otherwise described herein, the building surface cladding system comprises a conventional second building surface panel including a panel body with a length extending from a first end to a second end, a width extending from a first edge to a second edge, a front face, and a rear face, where the front face has a surface texture that extends from the first edge to the second edge. Second panel further includes a first lock extending along the first edge of the panel body, a second lock extending along the second edge of the panel body, and a fastening strip secured to the first lock.

Figure 7:
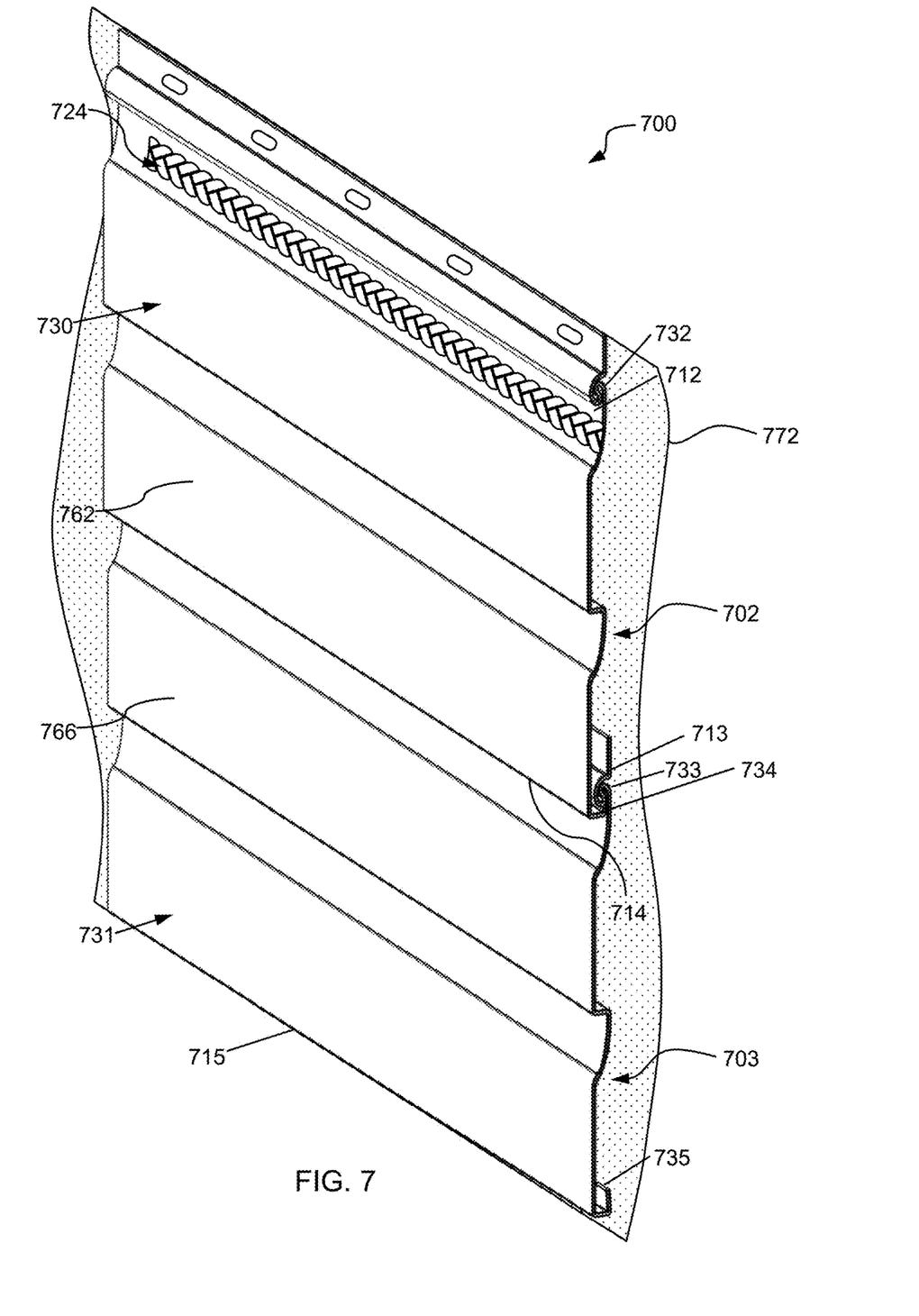
FIG. 7 is a schematic perspective view of a building surface cladding system according to another embodiment of the disclosure.

An embodiment of a building surface cladding system including such a second building surface panel is shown in FIG. 7. Building surface cladding system 700 includes a support structure 772 and a first building surface panel 762. First building surface panel 762 includes a panel body 702 with a first edge 712 and a second edge 714. A first lock 732 extends along first edge 712 of panel body 702 and a second lock 734 extends along second edge 714 of panel body 702. First building surface panel 762 also includes a first strip 720 including a geometric pattern 724. Building surface cladding system 700 also includes a conventional second building surface panel 766 locked to first building surface panel 762. Second building surface panel 766 includes a panel body 703 with a first edge 713 and a second edge 715. A first lock 733 extends along first edge 713 of panel body 703 and a second lock 735 extends along second edge 715 of panel body 703. For example, second building surface panel 766 includes panel body 703 that is conventional and does not have a geometric pattern. Further, second building surface panel 766 has a single surface texture that extends from the first edge 712 to the second edge 714.

In certain embodiments of the siding panel as otherwise described herein, the surface texture of the front face of the second panel body is similar to the surface texture of the second strip. For example, surface texture 730 of first building surface panel 762 is the same as surface texture 731 of second building surface panel 766. In some embodiments, the surface texture of the front face of the second panel body and the surface texture of the second strip are both a wood grain. Further, in other embodiments, the surface texture of the front face of the second panel body and the surface texture of the second strip are both smooth.

In certain embodiments of the siding panel as otherwise described herein, the first lock of the first building surface panel is engaged with the second lock of the second building surface panel. For example, second lock 634 of first building surface panel 662 is engaged with first lock 633 of second building surface panel 664 so that they form a continuous surface. In some embodiments the two building surface panels are further engaged with additional panels.

Another aspect of the disclosure is a method of forming a siding panel according to the disclosure. The method includes extruding a material sheet through a die. The method also includes positioning the material sheet against a form with a three dimensional surface pattern, and pressing the material sheet against the three dimensional surface pattern of the form to impart the three dimensional surface texture to a front surface of the material sheet. The method also includes shaping the material sheet so as to form the panel body, the first lock, the second lock, and the fastening strip.

In certain embodiments of the siding panel as otherwise described herein, shaping the material sheet includes bending at least a portion of the panel body so as to form a siding panel profile across the width of the panel body. Forming the siding panel profile across the width of the panel body may determine the style of siding being formed.

In certain embodiments of the siding panel as otherwise described herein, shaping the material sheet includes bending the material sheet so as to form the first lock along the first edge. For example, in some embodiments, the first lock is created by folding a portion of the extruded material sheet over itself. Folding the material sheet forms a lip that can fit within a corresponding second lock. Further, in some embodiments, shaping the material sheet includes bending the material sheet so as to form the second lock along the second edge. For example, in some embodiments, the second lock is folded so as to create a hook configured to receive the first lock. The locks, when used in combination, are configured to hold two siding panels together on the support structure.

In certain embodiments of the siding panel as otherwise described herein, shaping the material sheet includes bending the material sheet so as to form the fastening strip along the first edge. In some embodiments the fastening strip is in the form of a nail hem that is used to secure the building surface panels while in use. In certain embodiments of the siding panel as otherwise described herein, shaping the material sheet includes providing a plurality of fastener apertures in the fastening strip. For example, fastener strip 670 was formed on first building surface panel 662 by shaping the material sheet. Likewise, fastener apertures 668 are disposed on fastening strip 670 by cutting slots in the fastening strip 670.

In certain embodiments of the siding panel as otherwise described herein, pressing the material sheet against the form is carried out in an embossing step. For example, in some embodiments, the three dimensional pattern is created by using rollers with protruding designs to emboss the pattern on the front face of the material sheet. For example, the rollers are pressed and rolled over the front surface to imprint the geometric pattern on to the panel body, thus creating the three dimensional texture. In some embodiments the three dimensional pattern is created by using a roller on the front face and a roller on the rear face creating a geometric pattern on both faces.

In certain embodiments of the siding panel as otherwise described herein, pressing the front surface against the form is carried out in a vacuum forming process. The three dimensional pattern is created by vacuum forming it onto the panel body. In some embodiments, because of the nature of vacuum forming, the three dimensional pattern appears on both the front face and rear face of the panel body.

Various aspects and embodiments of the disclosure are provided by the following enumerated embodiments, which may be combined in any number and in any combination no logically or technically inconsistent.

Embodiment 1. A siding panel comprising:
　a panel body having a length extending from a first end to a second end, a width extending from a first edge to a second edge, a front face, and a rear face, the panel body comprising:
　　a first strip extending along the length of the panel body and including a three dimensional surface texture on the front face, the three dimensional surface texture having a geometric pattern including a pattern segment that repeats along the length of the panel body, and a second strip extending along the length of the panel body adjacent to the first strip and including a surface texture that is different than the surface texture of the first strip;

a first lock extending along the first edge of the panel body;

a second lock extending along the second edge of the panel body; and a fastening strip secured to the first lock.

Embodiment 2. The siding panel according to embodiment 1, wherein a length of the repeating pattern segment of the geometric pattern is no more than 6 inches.

Embodiment 3. The siding panel according to embodiment 1 or embodiment 2, wherein the geometric pattern is in a category of woven patterns, scale patterns, repeated line shapes, repeated polygons, or repeated elliptical shapes.

Embodiment 4. The siding panel according to embodiment 3, wherein the category of woven patterns comprises ropes, braids, hounds tooth, herringbone, knots, and basket weave.

Embodiment 5. The siding panel according to embodiment 3, wherein the category of scale designs comprises scallops, and scales.

Embodiment 6. The siding panel according to embodiment 3, wherein the category of repeated line patterns comprises chevron, crosshatch, argyle, stripes, and fret patterns.

Embodiment 7. The siding panel according to any of embodiments 1 to 6, wherein the surface texture of the second strip is flat.

Embodiment 8. The siding panel according to any of embodiments 1 to 6, wherein the surface texture of the second strip is a wood grain pattern.

Embodiment 9. The siding panel according to any of embodiments 1 to 8, wherein the first strip extends along the length of the panel body from the first end of the panel body to the second end of the panel body.

Embodiment 10. The siding panel according to any of embodiments 1 to 9, wherein the first strip extends along a majority of the length of the panel body, e.g., 75%, e.g., 80%, e.g., 90%, e.g., 95%.

Embodiment 11. The siding panel according to any of embodiments 1 to 10, wherein the second strip extends along the length of the panel body from the first end of the panel body to the second end of the panel body.

Embodiment 12. The siding panel according to any of embodiments 1 to 11, wherein a width of the first strip is in a range from 1 inch to 10 inches, e.g., from 1.5 inches to 6 inches, e.g., from 2 inches to 4 inches.

Embodiment 13. The siding panel according to any of embodiments 1 to 12, wherein the first strip is adjacent to the first edge of the panel body.

Embodiment 14. The siding panel according to any of embodiments 1 to 12, wherein the panel body has a middle half way between the first edge and the second edge and the first strip is adjacent to the middle of the panel body.

Embodiment 15. The siding panel according to any of embodiments 1 to 12, wherein the first strip is adjacent to the second edge of the panel body.

Embodiment 16. The siding panel according to any of embodiments 1 to 15, wherein the panel body has a siding panel profile across the width of the panel body, the siding panel profile including a first profile section having a planar shape and a second profile section having a non-planar shape.

Embodiment 17. The siding panel according to embodiment 16, wherein the first strip is disposed on the first profile section and the second strip is disposed on the second profile section.

Embodiment 18. The siding panel according to embodiment 16, wherein the first strip is disposed on the second profile section and the second strip is disposed on the first profile section.

Embodiment 19. The siding panel according to any of embodiments 1 to 18, wherein the panel body includes a third strip.

Embodiment 20. The siding panel according to embodiment 19, wherein the surface texture of the third strip is flat.

Embodiment 21. The siding panel according to embodiment 19, wherein the surface texture of the third strip is a wood grain pattern.

Embodiment 22. The siding panel according to any of embodiments 19 to 21, wherein the first strip is disposed between the second strip and the third strip on the panel body.

Embodiment 23. The siding panel according to any of embodiments 1 to 22, wherein the first strip has a first color, the second strip has as second color, and the first and second colors are different.

Embodiment 24. The siding panel according to any of embodiments 1 to 23, wherein the panel body includes a backing member that extends from the first edge to the second edge, wherein the surface texture of the second strip is integrated with the backing member, and wherein the three dimensional surface texture of the first strip is disposed on a carrier that is attached to the backing member.

Embodiment 25. The siding panel according to any of embodiments 1 to 24, wherein the panel body is formed of one or more of polypropylene, polyethylene, polyvinyl chloride (PVC), acrylonitrile styrene acrylate (ASA), acrylonitrile ethylene styrene (AES), polyurethane, or acrylonitrile butadiene styrene (ABS).

Embodiment 26. The siding panel according to any of embodiments 1 to 25, wherein the length of the panel body is in a range from 4 feet to 30 feet, e.g., 6 feet to 24 feet, e.g., 8 feet to 20 feet.

Embodiment 27. The siding panel according to any of embodiments 1 to 26, wherein the width of the panel body is in a range from 3 inches to 24 inches, e.g., from 4 inches to 18 inches, e.g., from 8 inches to 14 inches.

Embodiment 28. The siding panel according to any of embodiments 1 to 27, wherein the panel body has a material thickness in a range from 0.03 inches to 0.20 inches.

Embodiment 29. A building surface cladding system comprising:

a support structure;

a first building surface panel according to any of embodiments 1 to 28 attached to the support structure;

Embodiment 30. The building surface cladding system according to embodiment 29, wherein the building surface cladding system forms an exterior wall surface.

Embodiment 31. The building surface cladding system according to embodiment 29 or embodiment 30, wherein the support structure is an exterior sheathing.

Embodiment 32. The building surface cladding system according to any of embodiments 29 to 31, wherein the building surface cladding system comprises a second building surface panel according to any of embodiments 1 to 28 attached to the support structure.

Embodiment 33. The building surface cladding system according to any of embodiments 29 to 31, wherein the building surface cladding system comprises a second building surface panel comprising:

a panel body having a length extending from a first end to a second end, a width extending from a first edge to a second edge, a front face, and a rear face, the front face having a surface texture that extends from the first edge to the second edge;

a first lock extending along the first edge of the panel body;

a second lock extending along the second edge of the panel body; and a fastening strip secured to the first lock.

Embodiment 34. The building surface cladding system according to embodiment 32 or embodiment 33, wherein the surface texture of the front face of the second panel body is similar to the surface texture of the second strip.

Embodiment 35. The building surface cladding system according to any of embodiments 33 to 34, wherein the first lock of the first building surface panel is engaged with the second lock of the second building panel.

Embodiment 36. A method of forming a siding panel according to any of embodiments 1 to 28, the method comprising:

extruding a material sheet through a die;

positioning the material sheet against a form with a three dimensional surface pattern;

pressing the material sheet against the three dimensional surface pattern of the form to impart the three dimensional surface texture to a front surface of the material sheet;

shaping the material sheet so as to form the panel body, the first lock, the second lock, and the fastening strip.

Embodiment 37. The method of forming a siding panel according to embodiment 36, wherein shaping the material sheet includes bending at least a portion of the panel body so as to form a siding panel profile across the width of the panel body.

Embodiment 38. The method of forming a siding panel according to embodiment 36 or embodiment 37, wherein shaping the material sheet includes bending the material sheet so as to form the first lock along the first edge.

Embodiment 39. The method of forming a siding panel according to any of embodiments 36 to 38, wherein shaping the material sheet includes bending the material sheet so as to form the second lock along the second edge.

Embodiment 40. The method of forming a siding panel according to any of embodiments 36 to 39, wherein shaping the material sheet includes bending the material sheet so as to form the fastening strip along the first edge.

Embodiment 41. The method of forming a siding panel according to any of embodiments 36 to 40, wherein shaping the material sheet includes providing a plurality of fastener apertures in the fastening strip.

Embodiment 42. The method of forming a siding panel according to any of embodiments 36 to 41, wherein the pressing the material sheet against the form is carried out in an embossing step.

Embodiment 43. The method of forming a siding panel according to any of embodiments 36 to 41, wherein the pressing the material sheet against the form is carried out in a vacuum forming process.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A siding panel comprising:
a panel body having a length extending from a first end to a second end, a width extending from a first edge to a second edge, a front face, and a rear face, the panel body comprising:
a siding panel profile extending across the width of the panel body, the siding panel profile including a first profile section having a planar shape and a second profile section having a non-planar shape,
a first strip disposed on one of the first or second profile sections, the first strip extending along the length of the panel body and including a three dimensional surface texture imprinted on the front face, the three dimensional surface texture having a geometric pattern including a pattern segment that repeats along the length of the panel body, and
a second strip disposed on the other of the first or second profile sections, the second strip extending along the length of the panel body adjacent to the first strip and including a surface texture that is different than the surface texture of the first strip;
a first lock extending along the first edge of the panel body;
a second lock extending along the second edge of the panel body; and
a fastening strip secured to the first lock.

2. The siding panel according to claim 1, wherein the first strip is disposed on the first profile section and the second strip is disposed on the second profile section.

3. The siding panel according to claim 1, wherein the first strip is disposed on the second profile section and the second strip is disposed on the first profile section.

4. The siding panel according to claim 1, wherein a length of the repeating pattern segment of the geometric pattern is no more than 6 inches.

5. The siding panel according to claim 1, wherein the geometric pattern is in a category of woven patterns, scale patterns, repeated line shapes, repeated polygons, or repeated elliptical shapes.

6. The siding panel according to claim 1, wherein the surface texture of the second strip is flat.

7. The siding panel according to claim 1, wherein the first strip extends along the length of the panel body from the first end of the panel body to the second end of the panel body.

8. The siding panel according to claim 1, wherein the first strip extends along a majority of the length of the panel body.

9. The siding panel according to claim 1, wherein the second strip extends along the length of the panel body from the first end of the panel body to the second end of the panel body.

10. The siding panel according to claim 1, wherein the first strip is adjacent to the first edge of the panel body.

11. The siding panel according to claim 1, wherein the panel body has a middle half way between the first edge and the second edge and the first strip is adjacent to the middle of the panel body.

12. The siding panel according to claim 1, wherein the panel body includes a backing member that extends from the first edge to the second edge, wherein the surface texture of the second strip is integrated with the backing member, and wherein the three dimensional surface texture of the first strip is disposed on a carrier that is attached to the backing member.

13. The siding panel according to claim 1, wherein the length of the panel body is in a range from 4 feet to 30 feet; and the width of the panel body is in a range from 3 inches to 24 inches.

14. The siding panel according to claim 1, wherein the panel body includes a third strip.

15. The siding panel according to claim 14, wherein the surface texture of the third strip is flat.

16. The siding panel according to claim 14, wherein the first strip is disposed between the second strip and the third strip on the panel body.

17. A building surface cladding system comprising:
   a support structure; and
   a first building surface panel, wherein the first building surface panel comprises the siding panel according to claim 1 attached to the support structure.

18. The building surface cladding system according to claim 17, wherein the building surface cladding system comprises a second building surface panel comprising:
   a panel body having a length extending from a first end to a second end, a width extending from a first edge to a second edge, a front face, and a rear face, the front face having a surface texture that extends from the first edge to the second edge;
   a first lock extending along the first edge of the panel body;
   a second lock extending along the second edge of the panel body; and
   a fastening strip secured to the first lock.

* * * * *